US008061732B2

(12) United States Patent
Song et al.

(10) Patent No.: US 8,061,732 B2
(45) Date of Patent: Nov. 22, 2011

(54) CHILD STROLLER

(75) Inventors: Zhenghuan Song, Kunshan (CN); Feng Liu, Kunshan (CN)

(73) Assignee: Goodbaby Child Products, Co., Ltd., Kunshan (CN)

( * ) Notice: Subject to any disclaimer, the term of this patent is extended or adjusted under 35 U.S.C. 154(b) by 513 days.

(21) Appl. No.: 12/090,853

(22) PCT Filed: Sep. 29, 2006

(86) PCT No.: PCT/CN2006/002567
§ 371 (c)(1),
(2), (4) Date: Aug. 8, 2008

(87) PCT Pub. No.: WO2007/045149
PCT Pub. Date: Apr. 26, 2007

(65) Prior Publication Data
US 2008/0315562 A1    Dec. 25, 2008

(30) Foreign Application Priority Data
Oct. 18, 2005 (CN) .......................... 2005 1 0094952

(51) Int. Cl.
*B62B 1/04* (2006.01)
*B62B 7/06* (2006.01)

(52) U.S. Cl. ......... 280/650; 280/639; 280/642; 280/647

(58) Field of Classification Search .................. 280/650, 280/638, 639, 647, 642, 47.38
See application file for complete search history.

(56) References Cited

U.S. PATENT DOCUMENTS

| 2,410,797 | A | * | 11/1946 | Allenbaugh | 280/642 |
| 2,470,040 | A | * | 5/1949 | Mackin et al. | 280/643 |
| 3,873,117 | A | * | 3/1975 | Perego | 280/650 |
| 4,216,974 | A | * | 8/1980 | Kassai | 280/42 |
| 4,529,219 | A | * | 7/1985 | Shamie | 280/642 |
| 5,257,799 | A | * | 11/1993 | Cone et al. | 280/642 |
| 5,417,450 | A | * | 5/1995 | Wang | 280/642 |
| 5,622,377 | A | * | 4/1997 | Shamie | 280/642 |
| 6,086,086 | A | * | 7/2000 | Hanson et al. | 280/650 |
| 6,581,957 | B1 | * | 6/2003 | Lan | 280/642 |
| 7,032,922 | B1 | * | 4/2006 | Lan | 280/648 |

FOREIGN PATENT DOCUMENTS
EP         64368  A2  * 11/1982

* cited by examiner

*Primary Examiner* — Terrell McKinnon
*Assistant Examiner* — Chiedu Chibogu
(74) *Attorney, Agent, or Firm* — Stephen C. Beuerle; Procopio Cory Hargreaves & Savitch LLP

(57) ABSTRACT

A child stroller is disclosed comprising two side frames bilaterally set, each side frame comprising a front leg, a rear leg, the upside of the rear leg being rotatably connected with the rear end of the front leg, and a handspike with the lower end connected to the upper end of the rear leg, a positioning device set at the joint of the handspike and the rear leg, a first crossbar set between the two front legs, a second crossbar set between the two side frames, a first locking mechanism set between the first and the second crossbar, the second crossbar being connected to either the handspike or the rear leg or to both. Being locked in unfolding state by the positioning device and the first locking mechanism, the side frame is mainly composed of a front leg, a rear leg and a handspike. The stroller frame is simple and little interference occurs when folding and unfolding the stroller frame.

12 Claims, 17 Drawing Sheets

CHILD STROLLER

CROSS-REFERENCE TO RELATED APPLICATION

This application is the U.S. national stage application of international application serial number PCT/CN2006/002567, filed 29 Sep. 2006, which claims priority to Chinese patent application no. 2005-10094952.5, filed 18 Oct. 2005, each of which is incorporated herein by reference in its entirety.

FIELD OF THE INVENTION

Technical Field
This invention relates to a child stroller.

BACKGROUND OF THE INVENTION

Background Art
In the known art, a child stroller generally comprises of a stroller frame, front wheel groups and rear wheel groups set at the underside of the front and rear of the stroller frame respectively. The stroller frame is a folding one comprising two side frames bilaterally set and a plurality of crossbars set between the two side frames. Each said side frame comprises at least one handspike, one front leg and two rear legs. In order to ensure the stability of the child stroller, the side frame is usually mounted with connecting poles, for example, a pole may be rotatably set between the front leg and the rear leg, that is, the front end of the pole is rotatably connected with the front leg, while the rear end of the pole is rotatably connected with the rear leg or other components of the child stroller. However, since the child stroller is overburdened with poles, the interference between poles is serious when folding and unfolding the stroller frame.

SUMMARY OF THE INVENTION

Accordingly, the object of the present invention is to provide a simple child stroller, when folding and unfolding the stroller frame, the interference between components is minimized.

In order to achieve the object set forth, the present invention adopts the following schemes:

A child stroller comprises a foldable stroller frame, at least one front wheel group mounted under the foreside of the stroller frame, at least two rear wheel groups mounted under the rearward of the stroller frame, the stroller frame including two side frames bilaterally set and a plurality of crossbars set between the two side frames. Each side frame comprises a front leg for mounting the front wheel group, a rear leg for mounting the rear wheel group, the upside of the rear leg being rotatably connected with the rear end of the front leg, a handspike with the lower end connected to the upper end of the rear leg, a positioning device set at the joint of the handspike and the rear leg, the positioning device having a locking state, in which the handspike and the rear leg are fixedly connected, and an unlocking state, in which the handspike and the rear leg are rotateably connected, a second crossbar extending transversely between the two side frames, the second crossbar being connected either to the handspike or the rear leg or to both, and a first locking mechanism set between the first crossbar and the second crossbar, when in the locking state, the first crossbar and the second crossbar are fixedly connected and the stroller frame is unfolded; when in the unlocking state, the first crossbar and the second crossbar are movable relative to each other.

The first locking mechanism comprises a first locking member having a first hook, the first locking member being rotatably set at one component selected from the first crossbar and the second crossbar with the first hook detachably connected to the other component, when the first locking mechanism is in the locking state, the first hook hitches the other component, when in the unlocking state, the first hook is separated from the other component.

Preferably, the first locking member is rotatably set at the second crossbar. The first locking mechanism further comprises a first spring mounted between the first locking member and the second crossbar, so that the first hook tends to hook tightly with the first crossbar.

The extending direction of the pivotal axis of the first locking member is consistent with the transverse orientation of the child stroller.

Either the first crossbar or the second crossbar is formed with a receiving flute for the reception of the other component, the other component lying in the receiving flute when the first locking mechanism is in the locking state.

Still a second locking mechanism having a locking position and an unlocking position is set between the first crossbar and the second crossbar, when the first locking mechanism and the second locking mechanism are both in the locking position, the first crossbar and the second crossbar are fixedly connected, the stroller frame is unfolded; when the first locking mechanism and the second locking mechanism are both in the unlocking position, the first crossbar and the second crossbar are movable relative to each other.

The second locking mechanism mentioned above includes a second locking member having a second hook, the second locking mechanism rotatably set at one component choosing from the first crossbar and the second crossbar with the second hook detachably connected to the other component, when the second locking mechanism is in the locking position, the second hook hooks the other component, when the second locking mechanism is in the unlocking position, the second hook is separated from the other component.

Preferably, the second locking member is rotatably set at the second crossbar. The second locking mechanism further comprises a second spring mounted between the second locking member and the second crossbar, so that the second hook tends to hook tightly with the first crossbar.

The extending direction of the pivotal axis of the second locking member formed across with (and/or with perpendicular with respect to) the transverse orientation of the child stroller.

The first locking mechanism includes a first pole having a first locking protrusion, a second pole with the outer end rotatably connected to the second crossbar, the outer end of the first pole being rotatably connected to the first crossbar, a first locking member having a first locking flute, the first locking member being rotatably connected to the second crossbar, the first pole and the second pole are slidably connected, when the first locking mechanism is in the locking position, the first locking protrusion is inserted in the first flute, when in the unlocking position, the first locking protrusion is separated from the first flute.

The second crossbar is the pivotal axle of the handspike and the rear leg.

The first locking mechanism further includes a first spring set between the first locking member and the second crossbar, so that the first locking protrusion tends to hold tightly with the first flute.

Compared with prior art, the present invention is advantageous in that being locked in the unfolding state by the positioning device and the first locking mechanism, the side frame is mainly composed of a front leg, a rear leg and a handspike, and the child stroller is simple with little interference between components during folding and unfolding processes.

BRIEF DESCRIPTION OF THE DRAWINGS

FIG. 16 is a schematic view of the child stroller with a seat mounted on the stroller frame according to the second embodiment; wherein

DETAILED DESCRIPTION OF THE PREFERRED EMBODIMENT

Figure 1:
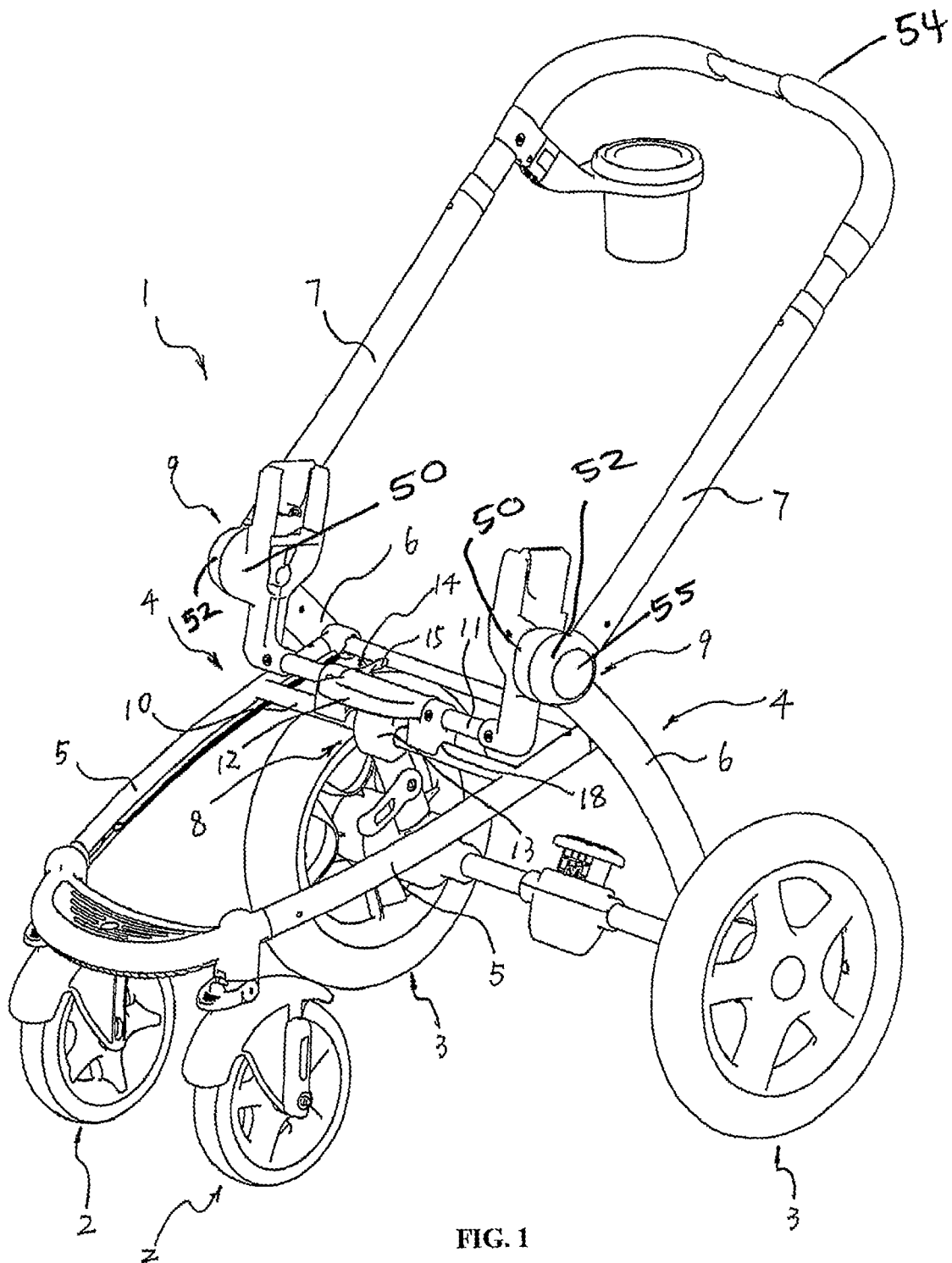
FIG. 1 is a perspective view of the unfolded child stroller in accordance with the first embodiment.
Figure 6:
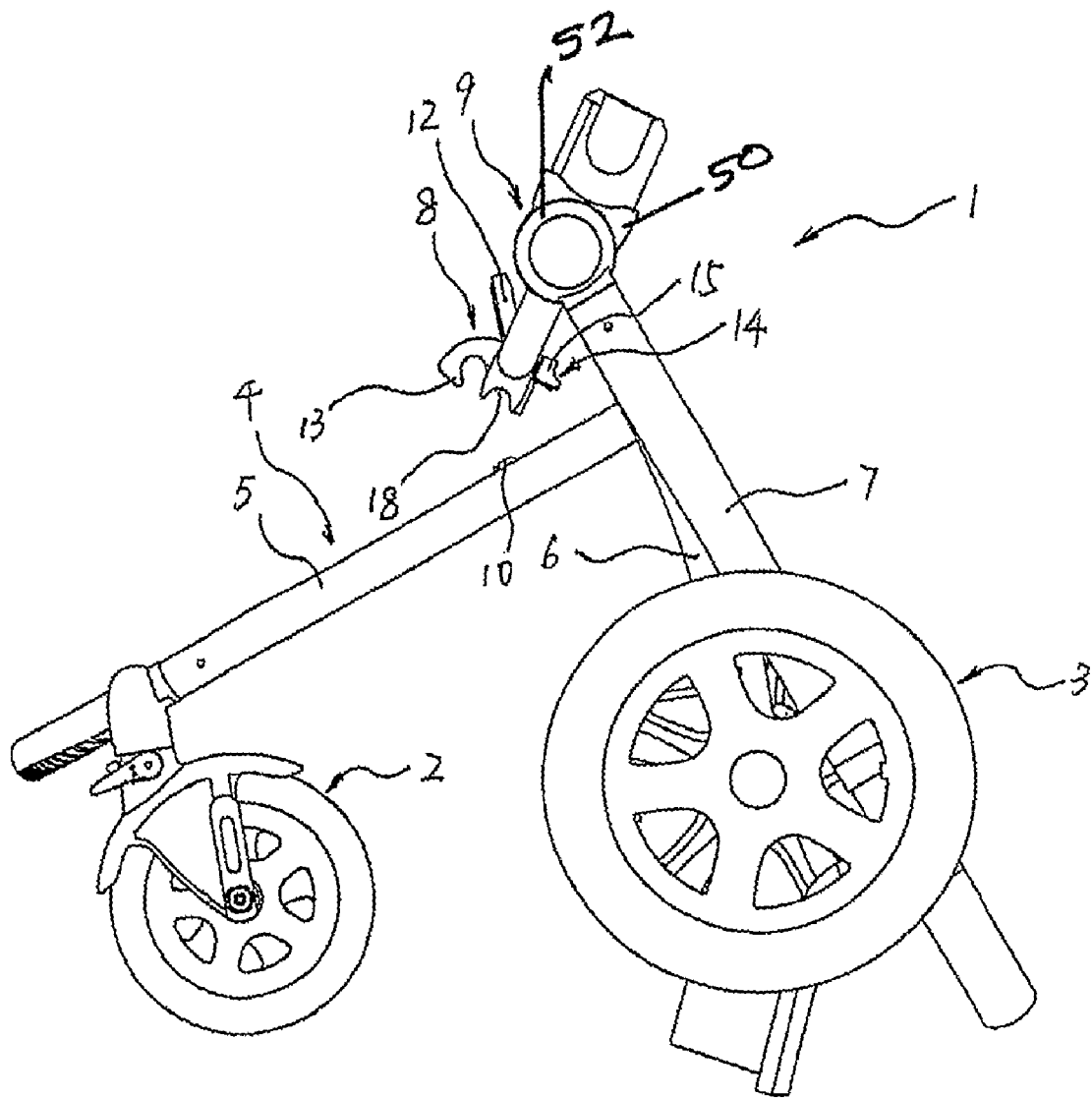
FIG. 6 is another schematic view of the child stroller half folded according to the first embodiment.
Figure 7:
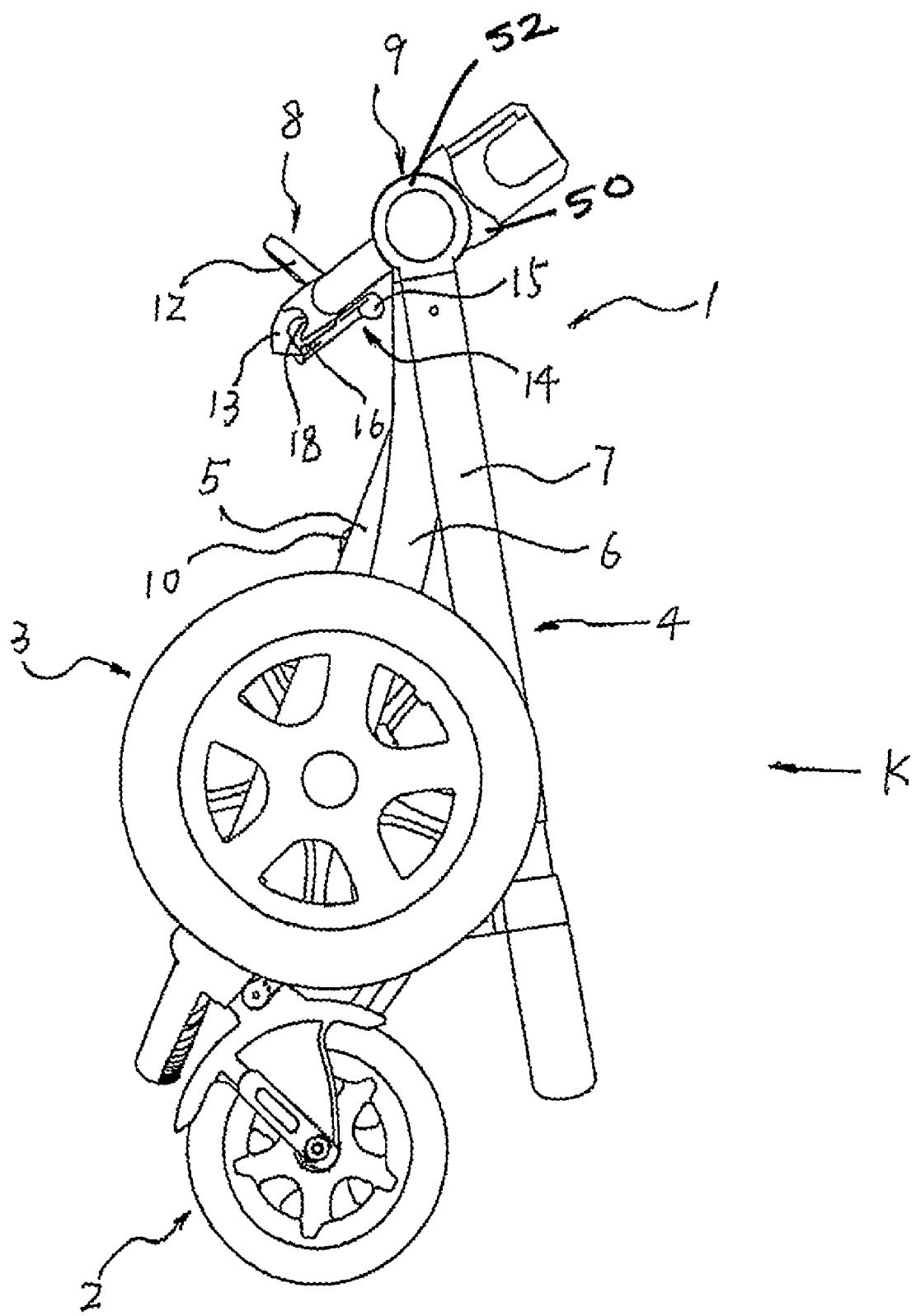
FIG. 7 is a schematic and folded view of the child stroller according to the first embodiment.
Figure 8:
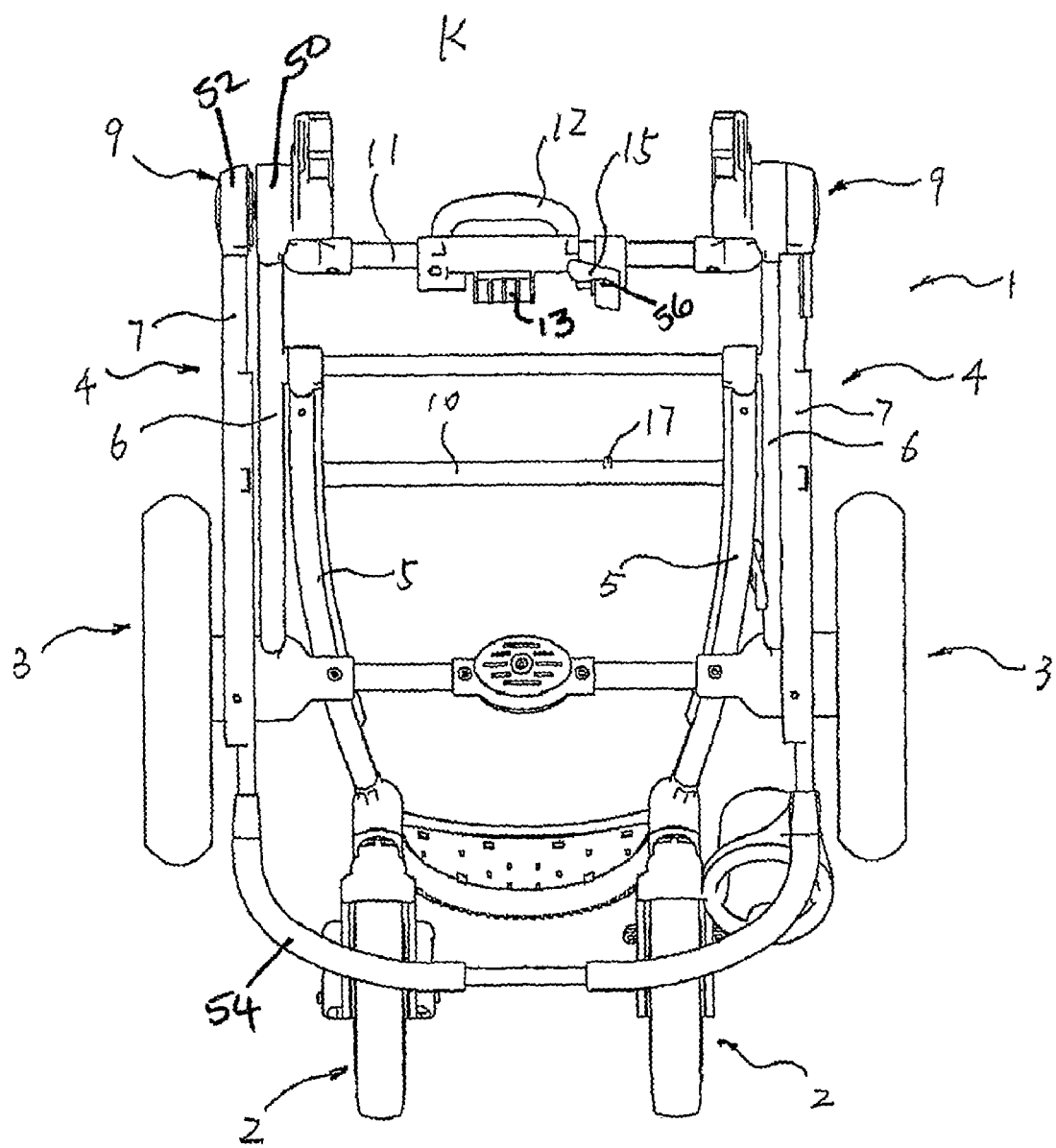
FIG. 8 is a view of FIG. 7 seen from K direction.

With reference to FIG. 1 through FIG. 8, the child stroller according to a first embodiment comprises a foldable stroller frame 1, a pair of front wheels or front wheel groups 2 mounted under a forward portion of the stroller frame 1, and a pair of rear wheels or rear wheel groups 3 mounted under a rear portion of the stroller frame 1. The stroller frame 1 includes two side frames 4 bilaterally set and a plurality of crossbars extending transversely between the two side frames 4. Each side frame 4 comprises a front leg 5 for mounting a respective front wheel 2, a rear leg 6 for mounting a respective rear wheel 3, the rear leg 6 being rotatably connected with the rear end of a rearwardly extending portion of the front leg 5, a handle member or handspike 7 with the lower end connected to the upper end of the rear leg 6, and a positioning device 9 set at the joint of the handspike 7 and the rear leg 6. The positioning device 9 has a locking state, in which the handspike 7 and the rear leg 6 are immovably connected, as illustrated in FIG. 1, and an unlocking state, in which the handspike 7 and the rear leg 6 are rotateably connected and the handspike can be rotated relative to the rear leg 6 into a folded condition as illustrated in FIGS. 7 and 8. A first crossbar 10 extends between rearwardly extending portions of front legs 5. A second crossbar 11 extends transversely between the two side frames 4, the second crossbar 11 being connected either to the handspike 7 or the rear leg 6 or to both. A first locking mechanism 8 is set between the first crossbar 10 and the second crossbar 11. When in the locking state, the first crossbar 10 and the second crossbar 11 are fixedly connected and the stroller frame 1 is unfolded. When in the unlocking state, the first crossbar 10 and the second crossbar 11 are movable relative to each other.

Figure 2:
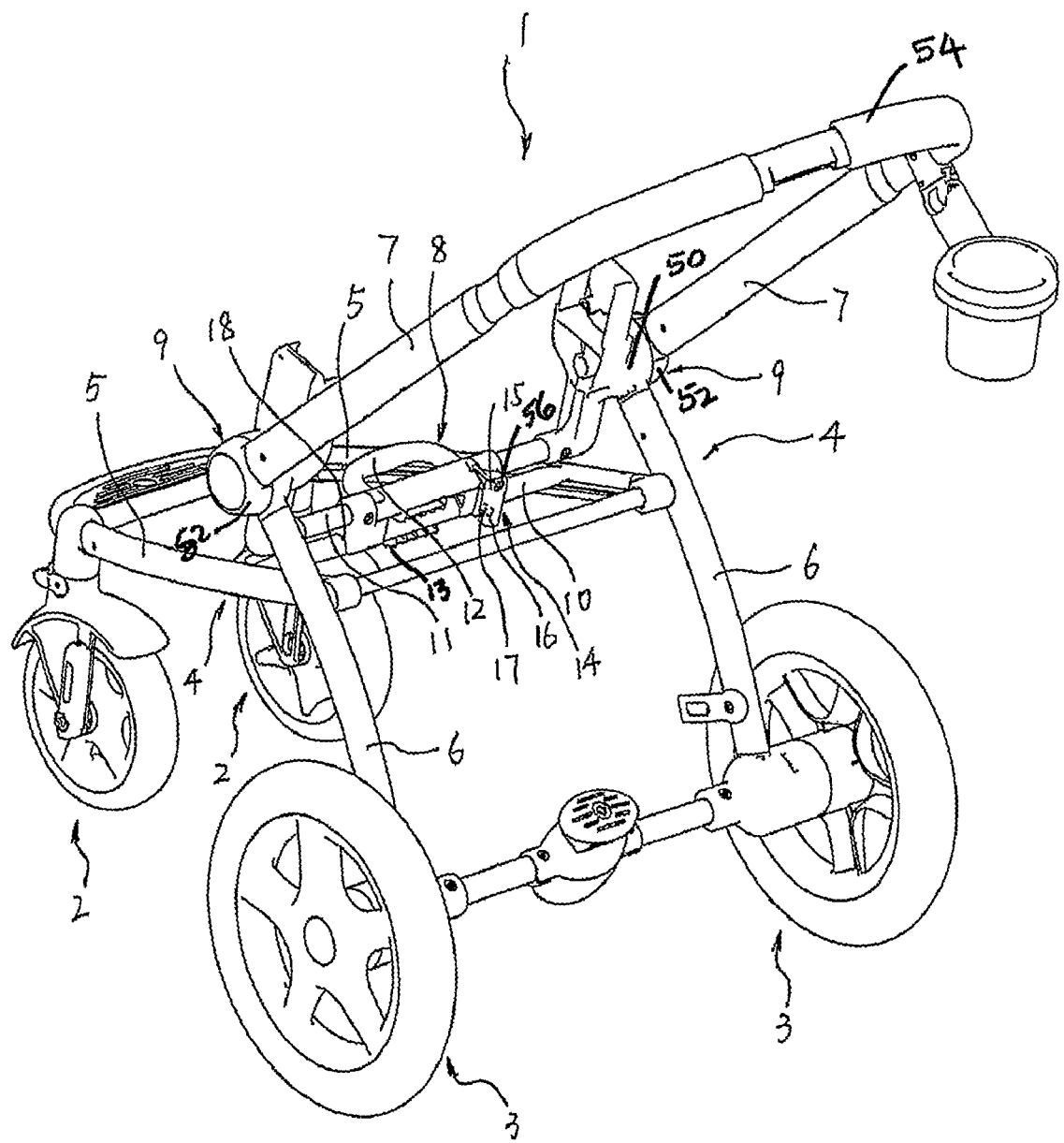
FIG. 2 is another perspective view of the unfolded child stroller according to the first embodiment.
Figure 3:
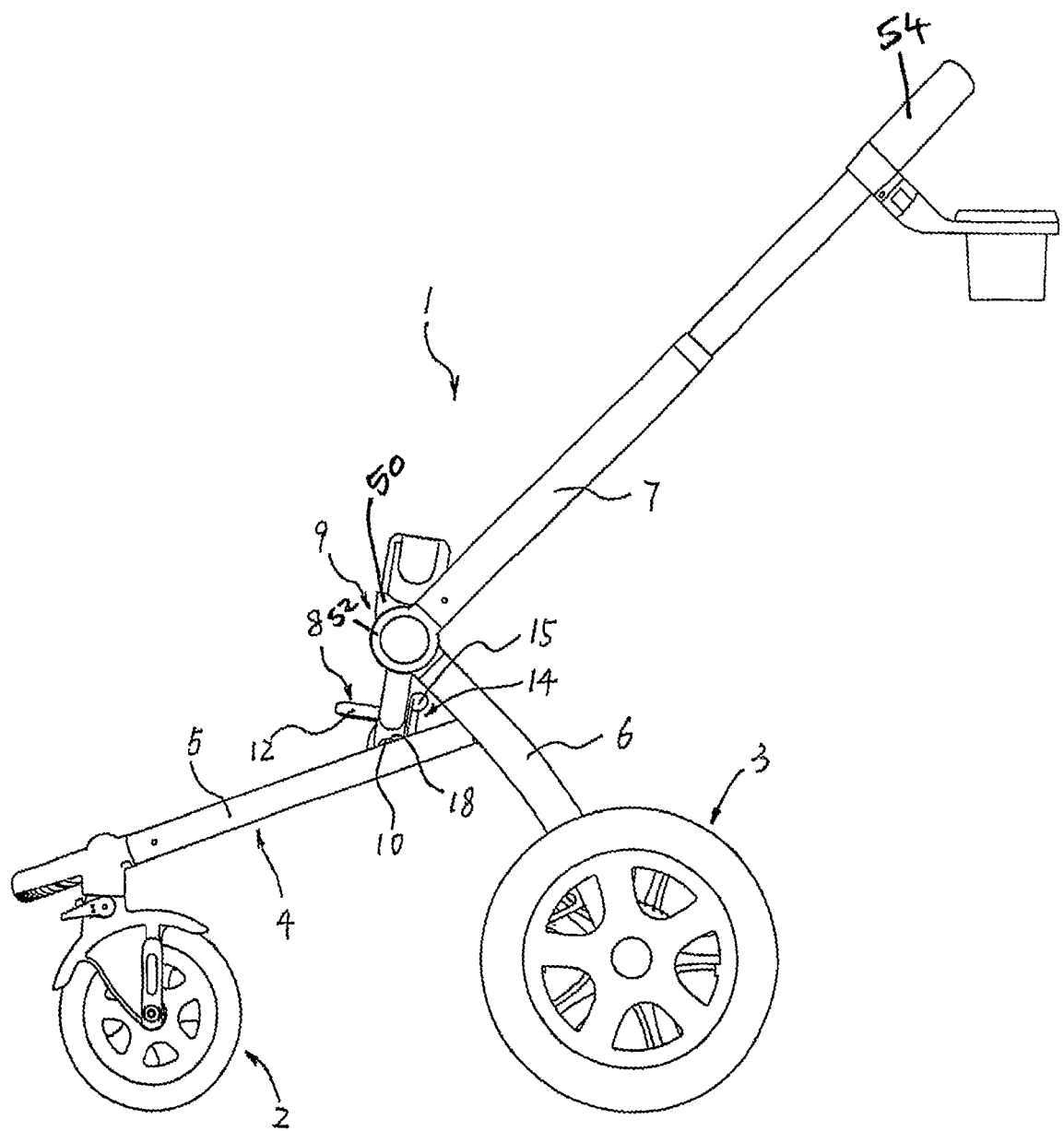
FIG. 3 is a schematic view of the unfolded child stroller according to the first embodiment.

The first locking mechanism 8 comprises a first locking member 12 having a first hook 13, as best illustrated in FIGS. 1, 2, 6, 8 and 17. The first locking member 12 is rotatably mounted on the second crossbar 11 with the first hook 13 detachably connected to the first crossbar 10 in the locked position of FIGS. 1 to 3. In other embodiments, locking member 12 may be rotatably mounted on the first crossbar and detachably connected to the second crossbar. When the first locking mechanism 8 is in the locked position, the first hook 13 is hooked over the first crossbar 10, as illustrated in FIGS. 1, 2 and 3. Locking member 12 is rotated in a clockwise direction from the locked position into the unlocked position of FIGS. 6 and 8, in which the first hook 13 is rotated out of engagement with the first crossbar 10. The first locking mechanism 8 may include a spring (not illustrated) which is mounted between the first locking member 12 and the second crossbar 11 to urge the locking member towards the locked position. When the first locking mechanism 8 is in the locking position, the first hook 13 tends to hook the first crossbar 10 in a tight and stable fashion.

The extending direction of the pivotal axis of the first locking member 12 is consistent with the transverse orientation of the child stroller.

Either the first crossbar 10 or the second crossbar 11 is formed with a receiving flute 18 for the reception of the other component, the other component lying in the receiving flute when the first locking mechanism 8 is in the locking state.

The second crossbar 11 can be selectively set between the two handspikes 7 or between the two rear legs. The second crossbar 11 can also be the pivotal axle of the handspike 7 and the rear leg 6.

The upper ends of the respective handle members 7 are joined by a generally U shaped handle 54 at their upper ends, and the resultant handle assembly has at least two working positions. In the first working position, each handspike 7 extends backward from bottom to top and at an angle to the rear leg 6, as illustrated in FIGS. 1 to 3. The rear leg 6 extends forward from bottom to top. In the second working position, each handspike 7 is rotated to extend substantially alongside the respective rear leg 6, as illustrated in FIGS. 6 to 8. Each positioning device 9 comprises a first part 50 secured to the upper end of the rear leg 6 and a second part 52 which is rotatable relative to the first part in an unlocked condition of the positioning device and which is secured to the lower end of handspike or handle member 7, as illustrated in FIGS. 2 and 8. In FIG. 8, the positioning devices 9 are both in an unlocked state and the second or outer part 52 of each positioning device along with the attached handspike 7 is rotated into the second working position. Any suitable releasable locking mechanism may be used to lock the first and second parts in the locked condition of FIG. 2. When released, for example via push button 55, the second part and handspike are rotatable relative to the first part between the locked position of FIG. 2 and the folded, unlocked position of FIG. 8.

Figure 4:
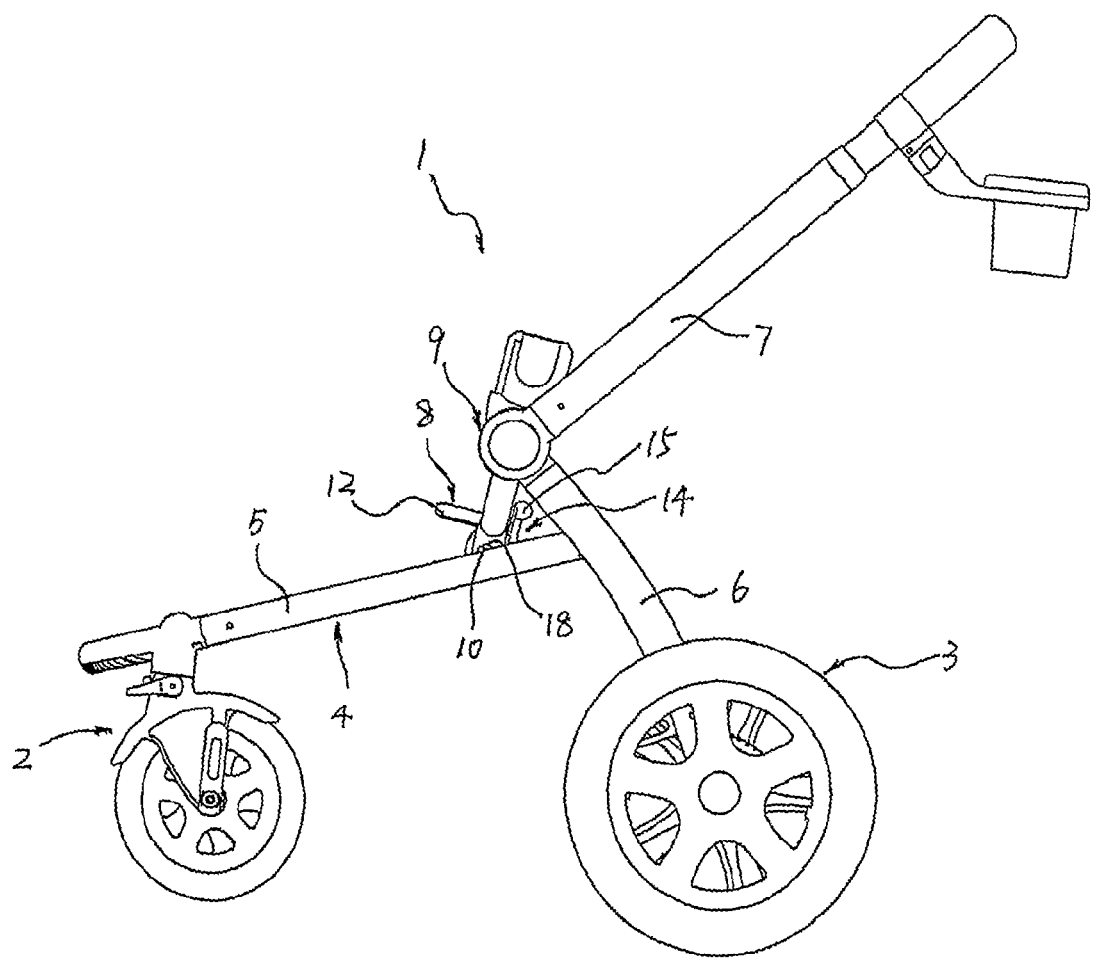
FIG. 4 is another schematic view of the unfolded child stroller according to the first embodiment while the upper handspike is collapsed relative to the handspike itself.
Figure 5:
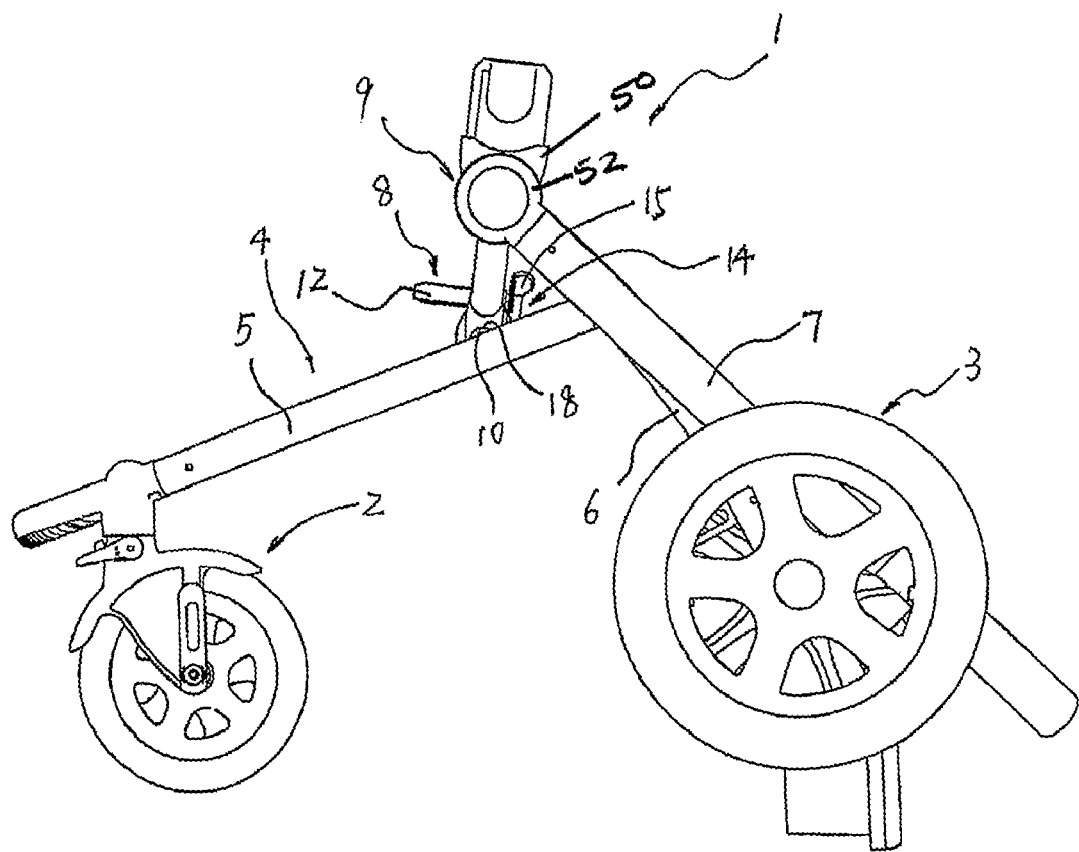
FIG. 5 is a schematic view of the child stroller half folded according to the first embodiment.

With reference to FIG. 3 and FIG. 4, an upper handspike is slidably set at the handspike 7. When the stroller frame 1 is unfolded, the upper handspike is retracted or withdrawn relative to the handspike 7 so as to provide more convenience for the operator; when the stroller frame 1 is folded, in order to cut the volume of the child stroller, the upper handspike 7 can be retracted or inserted relative to the handspike 7.

A handbag or a sleeping basket or a seat can be mounted between the two side frames 4.

Here, through the positioning device 9 and the first locking mechanism 8 the stroller frame 1 is locked in the unfolding position. Besides, a second locking mechanism 14 is set between the first crossbar 10 and the second crossbar 11 in pursuit of higher safety. The second locking mechanism 14 has a locking position and an unlocking position. When the second locking mechanism 14 and the first locking mechanism 8 are both in locking position, the first crossbar 10 is fixedly connected to the second crossbar 11, and the stroller frame 1 is unfolded; when the second locking mechanism 14 and the first locking mechanism 8 are both in unlocking position, the first crossbar 10 is movable with respect to the second crossbar 11.

The second locking mechanism 14 includes a second locking member 15 having a second hook 16, and may be rotatably mounted on the first crossbar 10 or the second crossbar 11 with the second hook 16 detachably connected to the other crossbar. In the illustrated embodiment, the second locking mechanism is rotatably mounted on the second crossbar 11, as best illustrated in FIGS. 1 to 3. When the second locking mechanism 14 is in the locked position, the second hook 16 is detachably connected to the first crossbar, as described in more detail below. When the second locking mechanism 14 is in the unlocked position, the second hook 16 is separated from the first crossbar 10, as illustrated in FIGS. 6 and 8.

Figure 17:
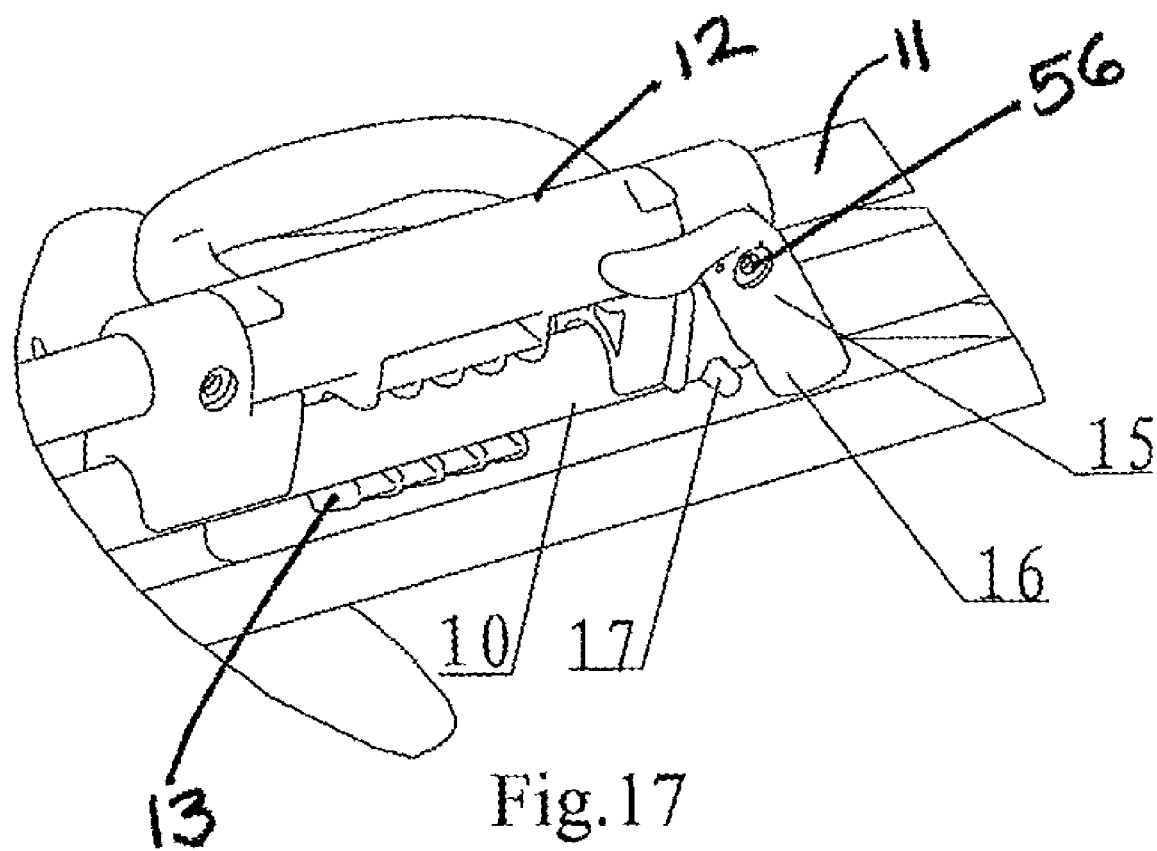
FIG. 17 is a partial schematic view of the first and second locking mechanism of FIGS. 1 to 8 illustrating the first locking mechanism in a locked position as in FIG. 1 and the second locking mechanism in an unlocked position, as in FIG. 6.

With reference to FIGS. 2, 6, 8 and 17, the second locking member 15 is rotatably mounted on the second crossbar 11. The first crossbar 10 is formed with a second locking protrusion 17. When the second locking mechanism is in the locked position, the second hook 16 is hooked under the second locking protrusion 17, as illustrated in FIG. 2. The second locking member 15 is rotated about pivot axis 56 which extends transverse to the pivot axis of first locking member 12 to move between the locked position of FIG. 2 and the unlocked position of FIGS. 6 and 17, in which the hook 16 is rotated away from protrusion 17, releasing crossbar 10. When in the unlocked position, the second hook 16 is separated from the second locking protrusion 17. FIG. 17 is an enlarged view of the second locking member 15 in the unlocked position illustrated in FIG. 6, while the first locking member is still in the locked position hooked under the first crossbar 10, i.e. shortly after releasing the hook 16 from protrusion 17. As can be seen by comparing the locked position of FIGS. 2 and 3 with the unlocked position of FIGS. 6 and 17, the locking member 15 is rotated in an anti-clockwise direction to rotate hook 16 away from protrusion 17. The second locking mechanism 14 may include a second spring (not illustrated) mounted between the second locking member 15 and the second crossbar 11, to bias the locking member into the locked position.

The pivotal axis of the second locking member 15 extends in a direction cross about the transverse orientation of the child stroller.

Figure 9:
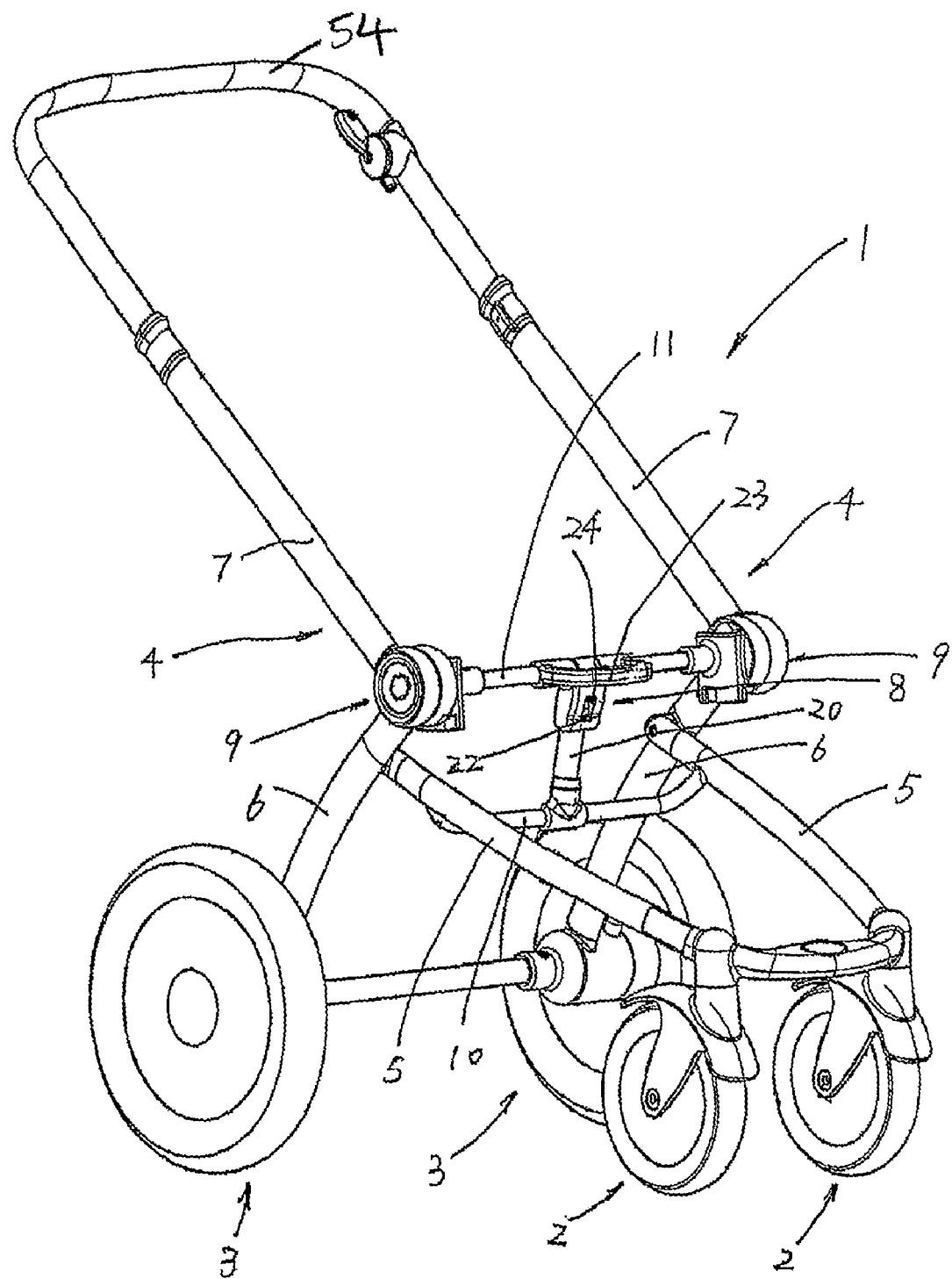
FIG. 9 is a perspective view of the unfolded child stroller according to the second embodiment.
Figure 10:
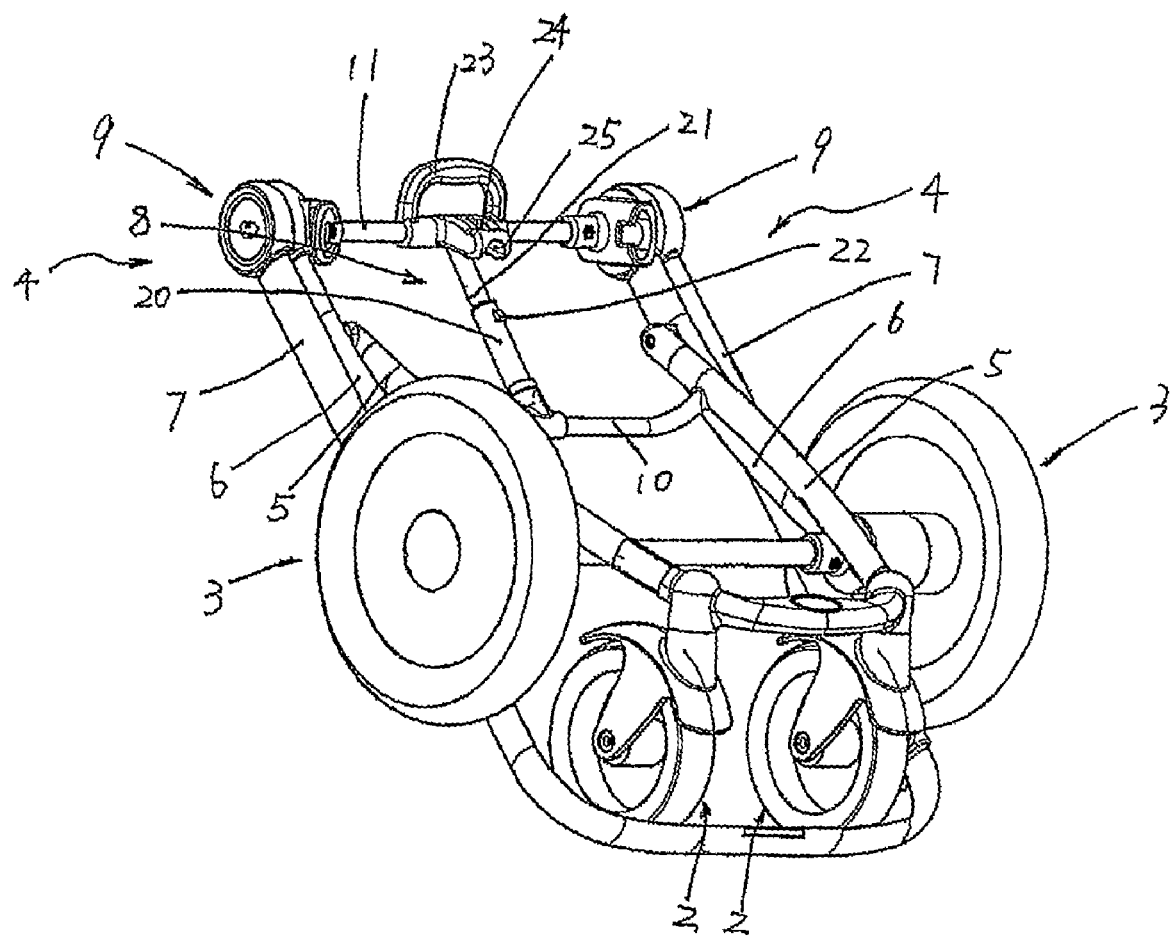
FIG. 10 is a perspective view of the folded child stroller according to the second embodiment.
Figure 12:
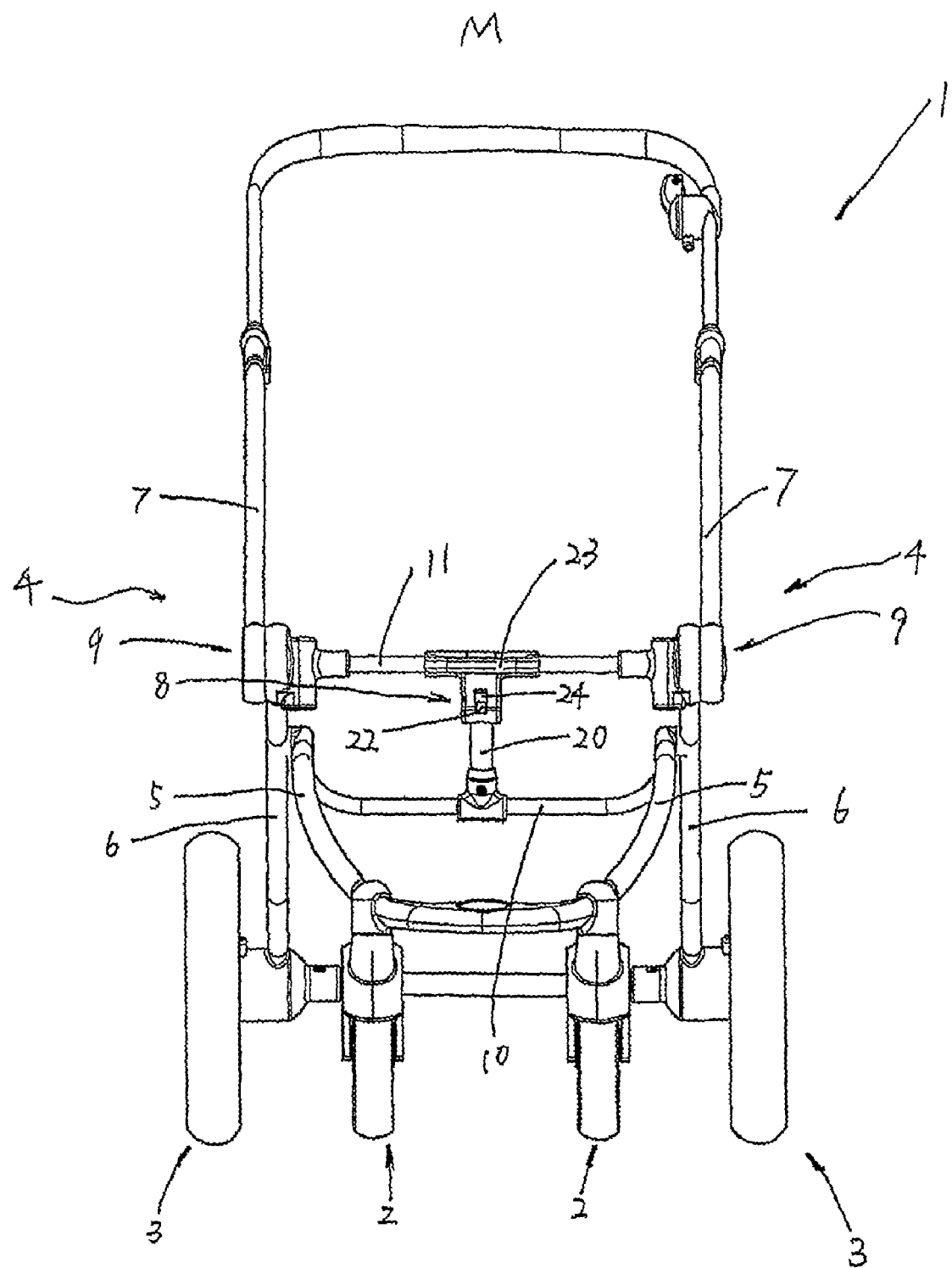
FIG. 12 is the view of FIG. 11 seen from M direction.

With reference to FIG. 9, FIG. 10 and FIG. 12, the child stroller according to second embodiment comprises a foldable stroller frame 1, two front wheel groups 2 mounted under the foreside of the stroller frame 1, two rear wheel groups 3 mounted under the rearward of the stroller frame 1, the stroller frame 1 including two side frames 4 bilaterally set and a plurality of crossbars set between the two side frames 4. Each side frame 4 comprises a front leg 5 for mounting the front wheel group 2, a rear leg 6 for mounting the rear wheel group 3, the upside of the rear leg 6 being rotatably connected with the rear end of the front leg 5, and a handspike 7 with the lower end connected to the upper end of the rear leg 6. A positioning device 9 is set at the joint of the handspike 7 and the rear leg 6, the positioning device 9 having a locking state, in which the handspike 7 and the rear leg 6 are immovably connected, and an unlocking state, in which the handspike 7 and the rear leg 6 are rotateably connected. A second crossbar 11 extends transversely between the two side frames 4, the second crossbar 4 being connected either to the handspike 7 or the rear leg 6 or to both. A first locking mechanism 8 is set between the first crossbar 10 and the second crossbar 11. When in the locking state, the first crossbar 10 and the second crossbar 11 are fixedly connected and the stroller frame 1 is unfolded; when in the unlocking state, the first crossbar 10 and the second crossbar 11 are movable relative to each other.

The first locking mechanism 8 includes a first pole 20 having a first locking protrusion 22, a second pole 21 with the outer end rotatably connected to the second crossbar 11, a first locking member 23 having a first locking flute 24, the outer end of the first pole 20 being rotatably connected to the first crossbar 10. The first locking member 23 is rotatably connected to the second crossbar 11. The first pole 20 and the second pole 21 being slidably connected to each other. When the first locking mechanism 8 is in the locking position, the first locking protrusion 22 is inserted in the first flute 24. When in the unlocking position, the first locking protrusion 22 is separated from the first flute 24.

Here the second crossbar 11 is the pivotal axle of the handspike 7 and the rear leg 6. The second crossbar 11 can be selectively set between the two handspikes 7 or the two rear legs 6.

The first locking mechanism 8 further includes a first spring set between the first locking member 23 and the second crossbar 11, so that the first locking protrusion 22 tends to lock tightly with the first flute 24.

Figure 11:
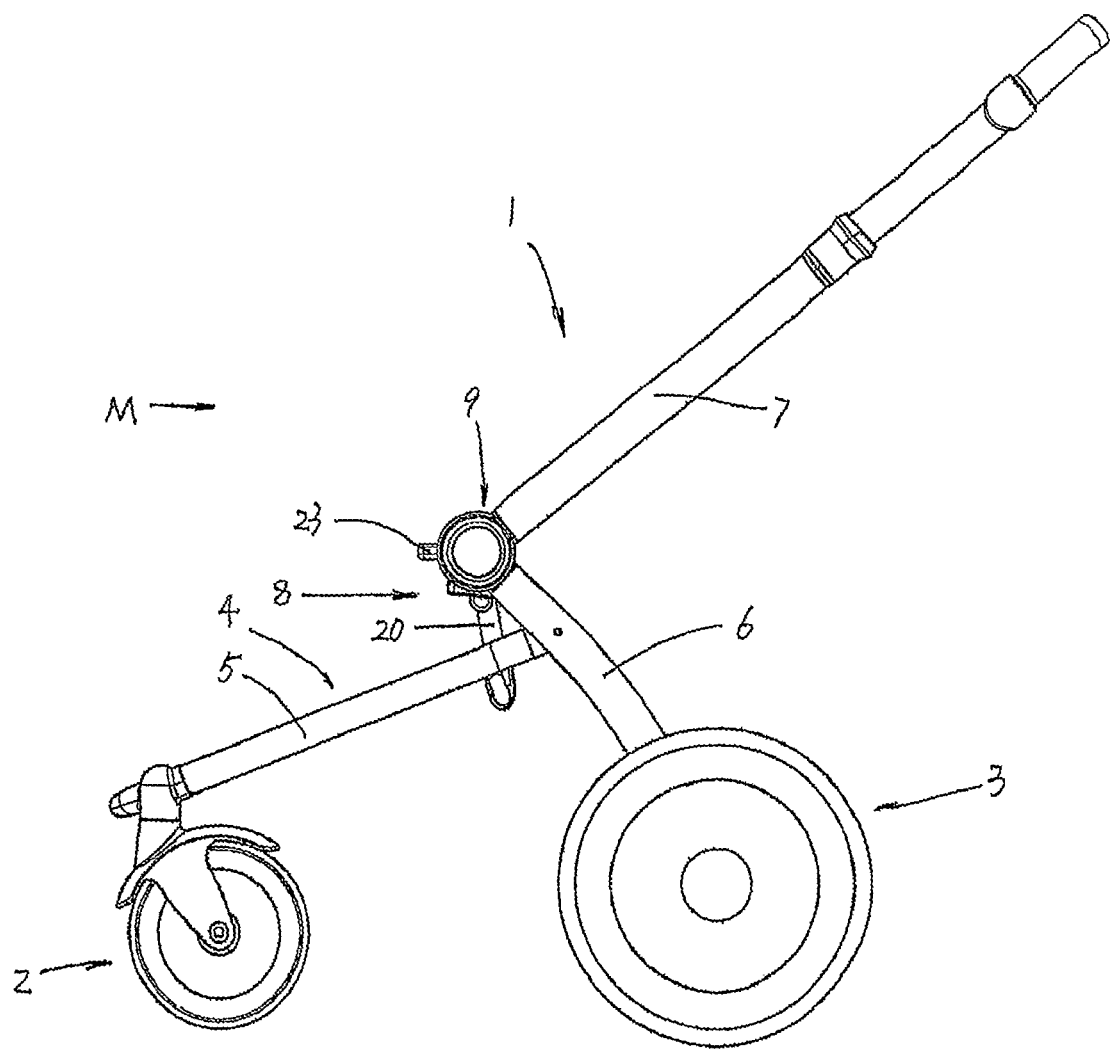
FIG. 11 is a schematic view of the unfolded child stroller according to the second embodiment.

FIG. 11 shows the unfolded child stroller 1. The first pole 20 and the second pole 21 both extend perpendicularly to the horizontal plane. The first crossbar 10 is set at the rearward of the front leg 5.

Figure 13:
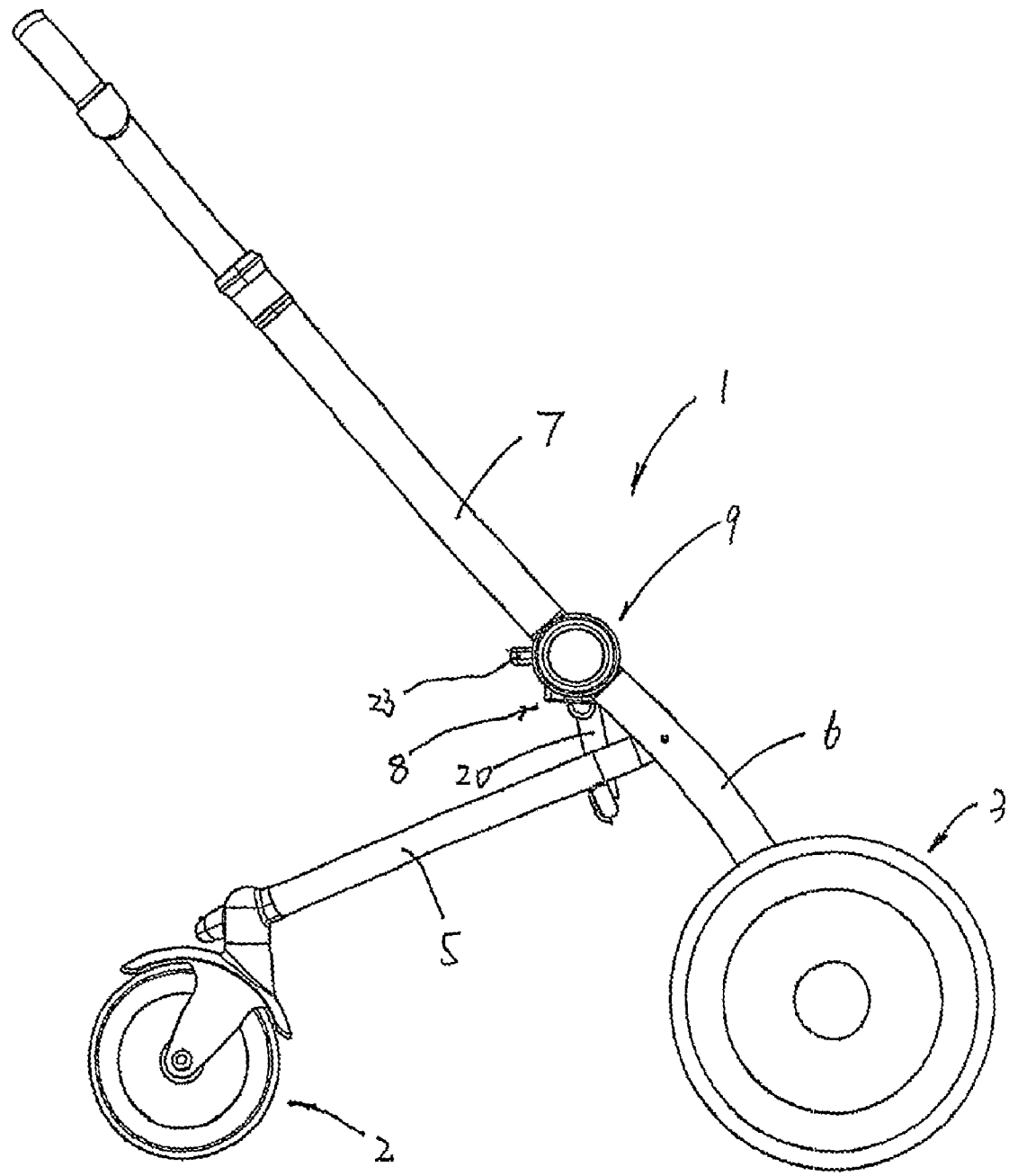
FIG. 13 is the schematic view of the unfolded child stroller according to the second embodiment while the hand is backward oriented.

With reference to FIG. 11 and FIG. 13, with the positioning device 9, the handspike 7 is provided with two working positions. In the first working position, the handspike 7 extends backward from bottom to top and is cornered with the rear leg 6 to form an angle. The rear leg 6 extends forward from bottom to top. In the second working position, the extending direction of the handspike 7 and that of the rear leg 6 are substantially the same. The positioning device 9 comprises two positioning grooves and sliding blocks slidably set about the two positioning grooves. When the positioning device 9 is in locking position, the sliding blocks are inserted in the two positioning grooves respectively; when in unlocking position, the sliding blocks are inserted in one of the positioning grooves.

With reference to FIG. 9 and FIG. 10, the first locking member 23 is formed with a flute 25 for receiving the first pole 20 when the stroller frame is unfolded.

Figure 14:
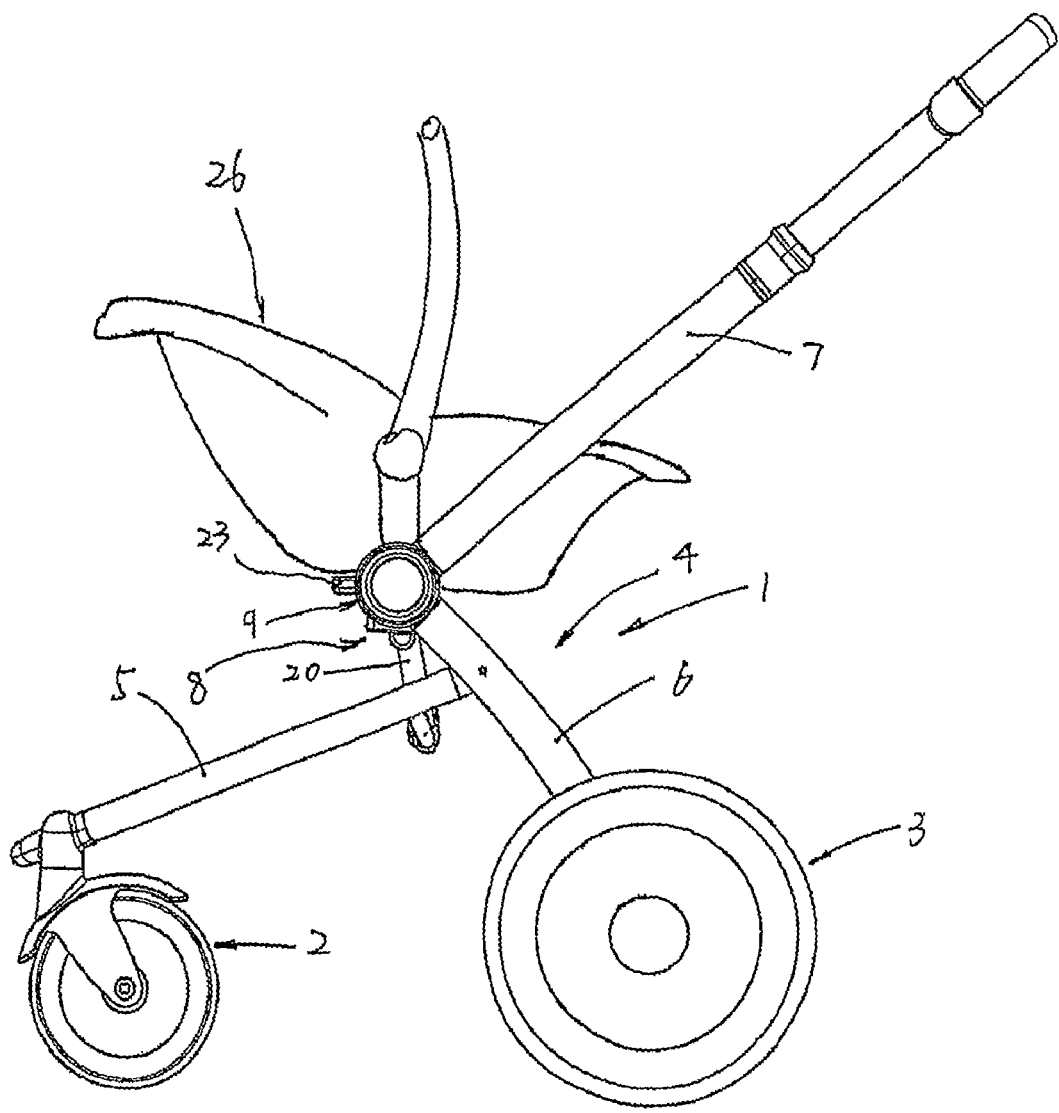
FIG. 14 is a schematic view of the child stroller with a handbag mounted on the stroller frame according to the second embodiment.

With reference to FIG. 14, a handbag 26 is mounted between the two side frames.

Figure 15:
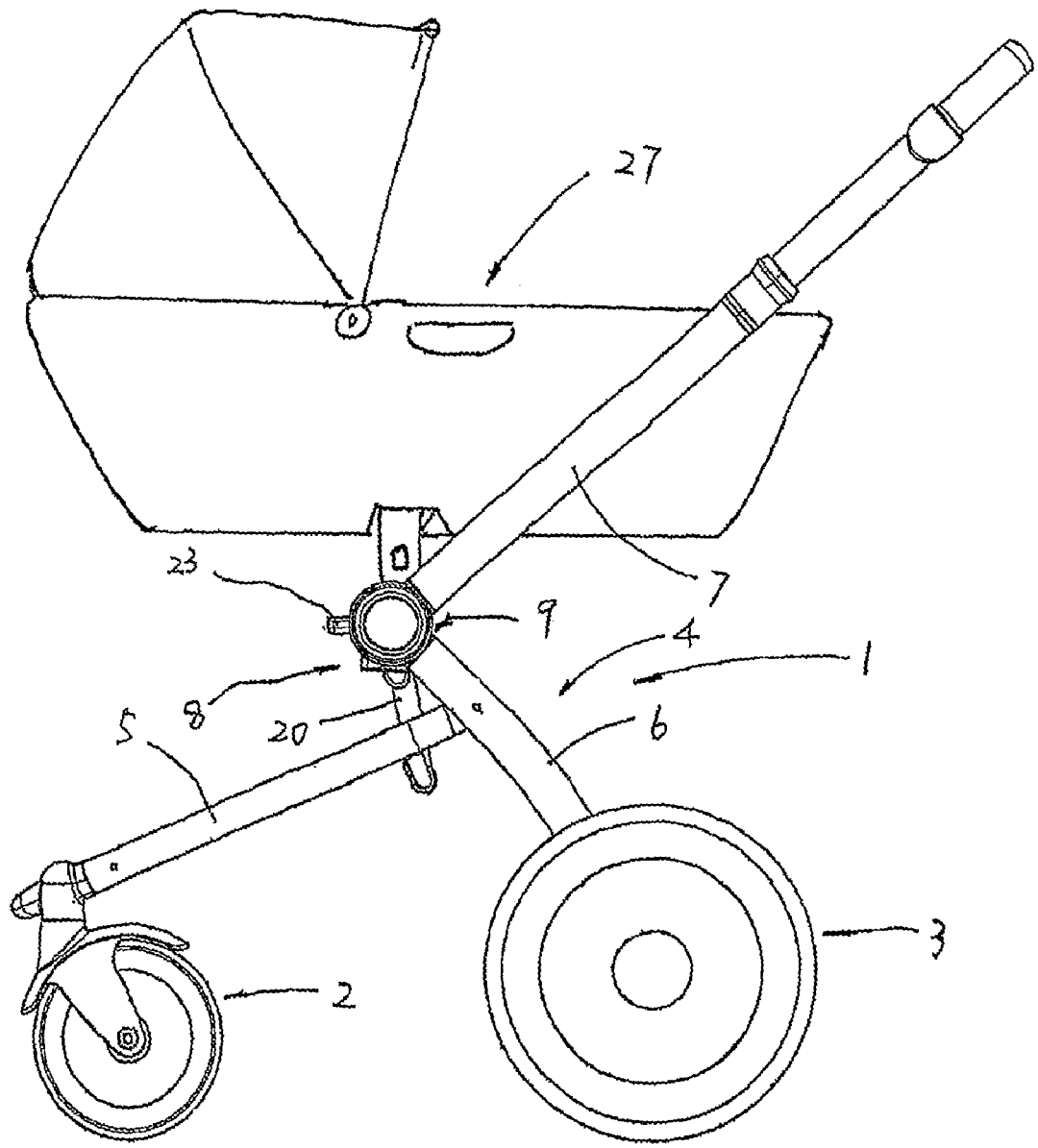
FIG. 15 is a schematic view of the child stroller with a sleeping basket mounted on the stroller frame according to the second embodiment.

With reference to FIG. 15, a sleeping basket 27 is mounted between the two side frames.

Figure 16:
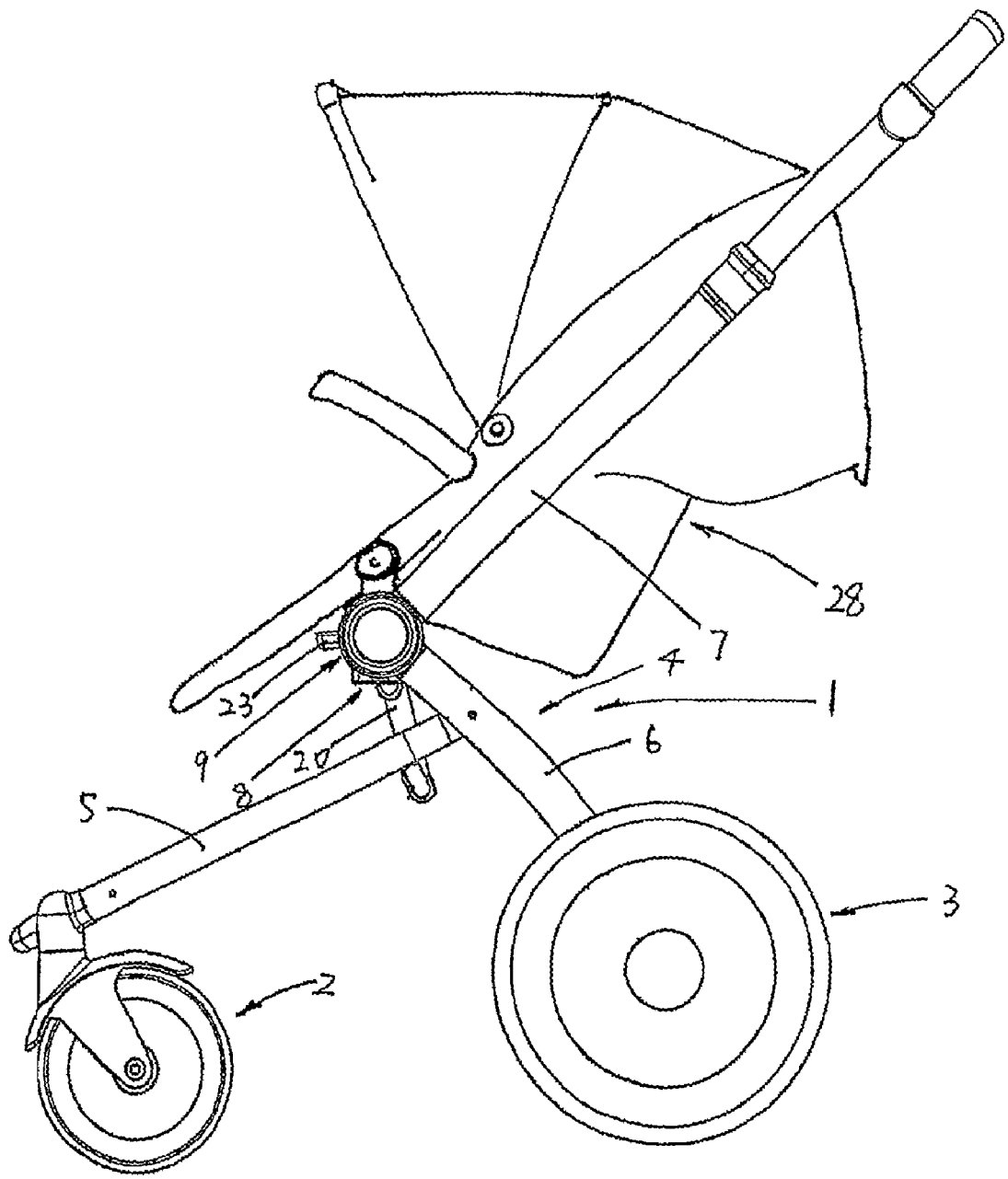

With reference to FIG. 16, a seat 28 is mounted between the two side frames.

An upper handspike is slidably set at the handspike 7 when the stroller frame 1 is unfolded, the upper handspike is unfolded relative to the handspike 7 so as to provide convenience for the operator; when the stroller frame 1 is folded, in order to cut the volume of the child stroller, the upper handspike 7 can be folded relative to the handspike 7.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof, and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A child stroller, comprising:
    a foldable stroller frame having a forward portion and a rear portion;
    at least one pair of front wheels mounted under the forward portion of the stroller frame;
    at least one pair of rear wheels mounted under the rear portion of the stroller frame;
    a rear axle extending between the rear wheels;
    the stroller frame comprising spaced side frames and at least first and second crossbars extending transversely between the side frames at locations spaced from said rear axle;
    each side frame comprising a front leg having a forward portion on which a respective front wheel is mounted and a rearwardly extending portion having a rear end, a rear leg rotatably connected to the rear end of the front leg, the rear wheels being mounted on respective rear legs on opposite side frames, a handle member, and a lockable positioning device connecting the handle member to the rear leg;
    each positioning device comprising first and second relatively rotatable parts secured to said rear leg and said handle member, respectively, whereby the second part is rotatable relative to the first part in an unlocked condition of the positioning device;
    the first crossbar being connected between the rearwardly extending portions of the front legs of the side frames;
    the second crossbar being connected between at least one of the handle member and rear leg of the respective side frames; and
    at least one locking mechanism between the first and second crossbars, wherein the first and second crossbar are secured together in a locked position of said at least one locking mechanism and the first and second crossbars are movable relative to one another in an unlocked position of said at least one locking mechanism, whereby the rear leg of the stroller frame can be rotated between an unfolded, operative position and a folded, storage position.

2. The child stroller according to claim 1, wherein said at least one locking mechanism comprises a first locking mechanism comprising a first locking member having a first hook, the first locking member being rotatably mounted for rotation about a first pivot axis on one of said crossbars and the first hook being configured to detachably hook over the other of said crossbars in the locked position and being separated from the other crossbar in the unlocked position of said first locking mechanism.

3. The child stroller according to claim 2, wherein the first pivot axis of said first locking member is transverse to said side frames.

4. The child stroller according to claim 2, wherein the first locking member is rotatably mounted on the second crossbar and the first hook is configured to detachably hook over the first crossbar in the locked position.

5. The child stroller according to claim 1, wherein either said first crossbar or said second crossbar is formed with a receiving flute for reception of the other of said first and second crossbars, the other of said first and second crossbars lying in said receiving flute when in the locking state.

6. The child stroller according to claim 1, wherein said at least one locking mechanism comprises first and second locking mechanisms each having a locked position and an unlocked position and configured to releasably secure the first and second crossbars together in the locked position and to release the crossbars in the unlocked position, whereby the first and second crossbars can be moved relative to one another in the unlocked position of the locking mechanisms to allow the rear leg of the stroller frame to be moved into a folded, storage position.

7. The child stroller according to claim 6, wherein said first locking mechanism includes a first locking member with a first hook and said second locking mechanism includes a second locking member with a second hook, at least one of said first and second locking members is rotatably mounted on the second crossbar and the hook of at least one of said first and second locking members is configured to detachably hook over the first crossbar in the locked position.

8. The child stroller according to claim 7, wherein both of said locking members are rotatably mounted on the second crossbar for rotation about respective first and second pivot axes with the respective hooks configured to detachably engage the first crossbar in the locked position.

9. The child stroller according to claim 8, wherein the first pivot axis extends transverse to the side frames and the second pivot axis extends transverse to the first pivot axis.

10. The child stroller according to claim 6, wherein said first and second locking mechanisms are each rotatably mounted on one of said first and second crossbars and releasably connectable to the other of said first and second crossbars, each locking mechanism comprising a locking member having a hook configured for detachable hooking over the other of said crossbars when the respective locking mechanism is in the locked position and being separated from the other of said crossbars when said second locking mechanism is in the unlocked position.

11. The child stroller according to claim 1, wherein said at least one locking mechanism includes a first locking mechanism, said first locking mechanism includes,
- a first pole having a first locking protrusion, said first pole having an outer end rotatably connected to said first crossbar;
- a second pole having an outer end rotatably connected to said second crossbar, said first pole and said second pole being slidably connected; and
- a first locking member having a first locking flute and being rotatably connected to said second crossbar,
- wherein said first locking protrusion is inserted in said first flute in a locking position and separated from said first flute in an unlocking position.

12. The child stroller according to claim 11, wherein said second crossbar comprises a pivotal axle of said handle member and said rear leg.

\* \* \* \* \*